May 18, 1954  J. KNAPIK  2,678,583
GIMBALED DIAPHRAGM FOR OPTICAL PROJECTION
PHOTOGRAMMETRIC PLOTTING INSTRUMENTS
Filed April 18, 1952  3 Sheets-Sheet 1

INVENTOR
John Knapik.

BY Albert J. Kramer
ATTORNEY

May 18, 1954

J. KNAPIK 2,678,583

GIMBALED DIAPHRAGM FOR OPTICAL PROJECTION
PHOTOGRAMMETRIC PLOTTING INSTRUMENTS

Filed April 18, 1952

INVENTOR
John Knapik.
BY Albert J. Kramer
ATTORNEY

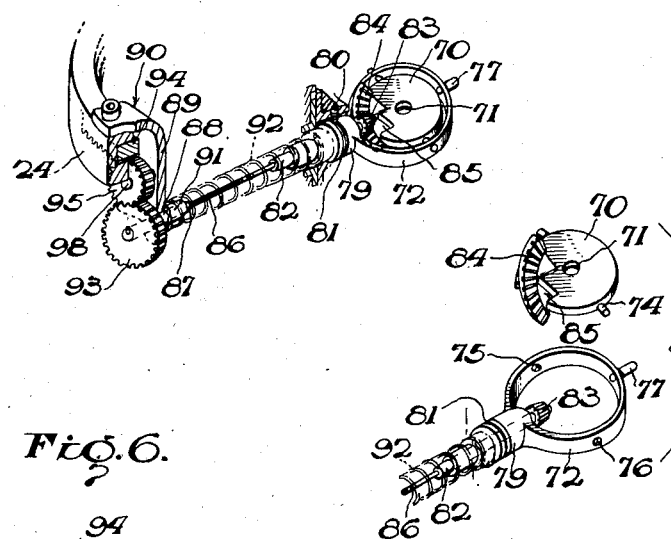
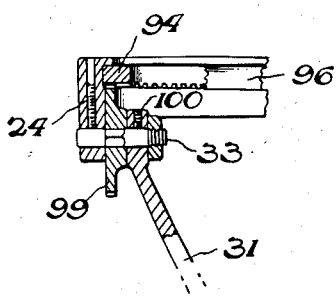
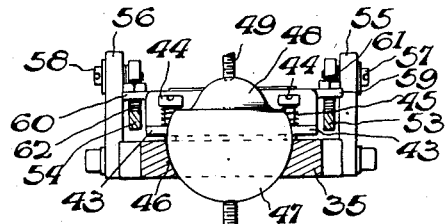
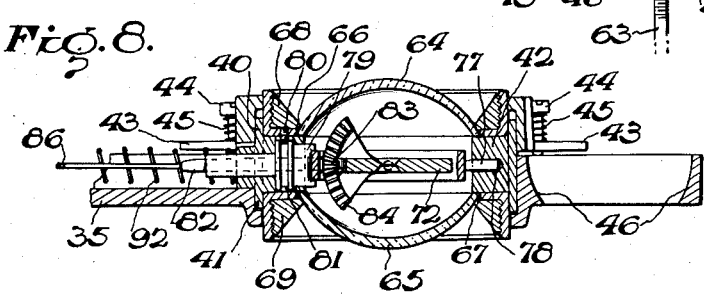

Patented May 18, 1954

2,678,583

UNITED STATES PATENT OFFICE 2,678,583

GIMBALED DIAPHRAGM FOR OPTICAL PROJECTION PHOTOGRAMMETRIC PLOTTING INSTRUMENTS

John Knapik, Baltimore, Md., assignor to Harry T. Kelsh, Washington, D. C.

Application April 18, 1952, Serial No. 283,041

9 Claims. (Cl. 88—24)

This invention relates to optical instruments having a diaphragm for limiting light passing through the lens system and has an important application to photogrammetric projection machines of the type described in U. S. Patent No. 2,552,975, issued on May 15, 1951, to Harry T. Kelsh.

Projection machines of this type comprise, generally, a pair of projection units, each having a diapositive mount, a movable light beam projector, means for moving the projector in an arc about the diapositive, a lens barrel mounted for vertical movement and a linkage system connecting the projector to the lens barrel for moving the latter vertically predetermined amounts when the light projector moves from one position to another relative to the diapositive. In all positions of the projector, light therefrom passes through the lens unit and the beam of light passing through the lens system is of limited size in order to confine it to the immediate area of the diapositives being used for mapping at any given time. It is desirable to incorporate in the lens barrel a diaphragm having a fixed central opening through which the light passes for utilizing the best optical area of the lens. However, since the light projector moves in an arc relative to the diapositive mount and its underlying lens unit, it is apparent that the amount of light passing through the diaphragm will vary for different angles. When the light beam is 90° to the diaphragm, the maximum light will be transmitted therethrough and the beam of light passing through the diaphragm will have a circular cross-section. However, as the light projector moves over the diapositive to positions at an angle to the diaphragm, the cross-section of the projected beam of light becomes an ellipse with the major axis equal to the diameter of the diaphragm and the minor axis varying as the cosine of the angle of deviation. At 45° from the central axis, for example, the reduction of light from this cause is about 35% of the amount falling on the center of the projected image.

One of the objects of this invention is the provision of improvements in a machine of the type mentioned which results in the light passing through the diaphragm at a constant angle, irrespective of the position of the light projector relative to the lens, thereby resulting in the projection of the maximum amount of light at all times.

One of the limiting factors to the usefulness of plotting instruments of this type is the focus depth. With the present invention, images projected from the outer edges of the diapositive have increased intensity making it possible to use smaller diaphragm openings. This has the effect of increasing the depth of focus. For any particular conditions, if the depth of focus is already sufficient, the present invention has the advantage, nevertheless, of making it possible for the operator to perform better work because of the increase in light when operating at or near the outer edges of the diapositives.

These and other objects and advantages of the invention will be fully apparent from the following description considered together with the accompanying drawing.

In the drawing:

Fig. 4 is a perspective view of a fragmentary portion of the embodiment showing the gear and drive arrangement between the diaphragm and the curved rack.

Fig. 5 is a partially exploded perspective view of the embodiment, showing the relation between the diaphragm and its supporting gimbal ring.

Fig. 6 is a cross sectional view of a fragmentary portion of the embodiment along the line 6—6 of Fig. 2.

Fig. 7 is an elevational section along the line 7—7 of Fig. 2.

Fig. 8 is an enlarged view of the central portion of Fig. 3.

Figure 1:
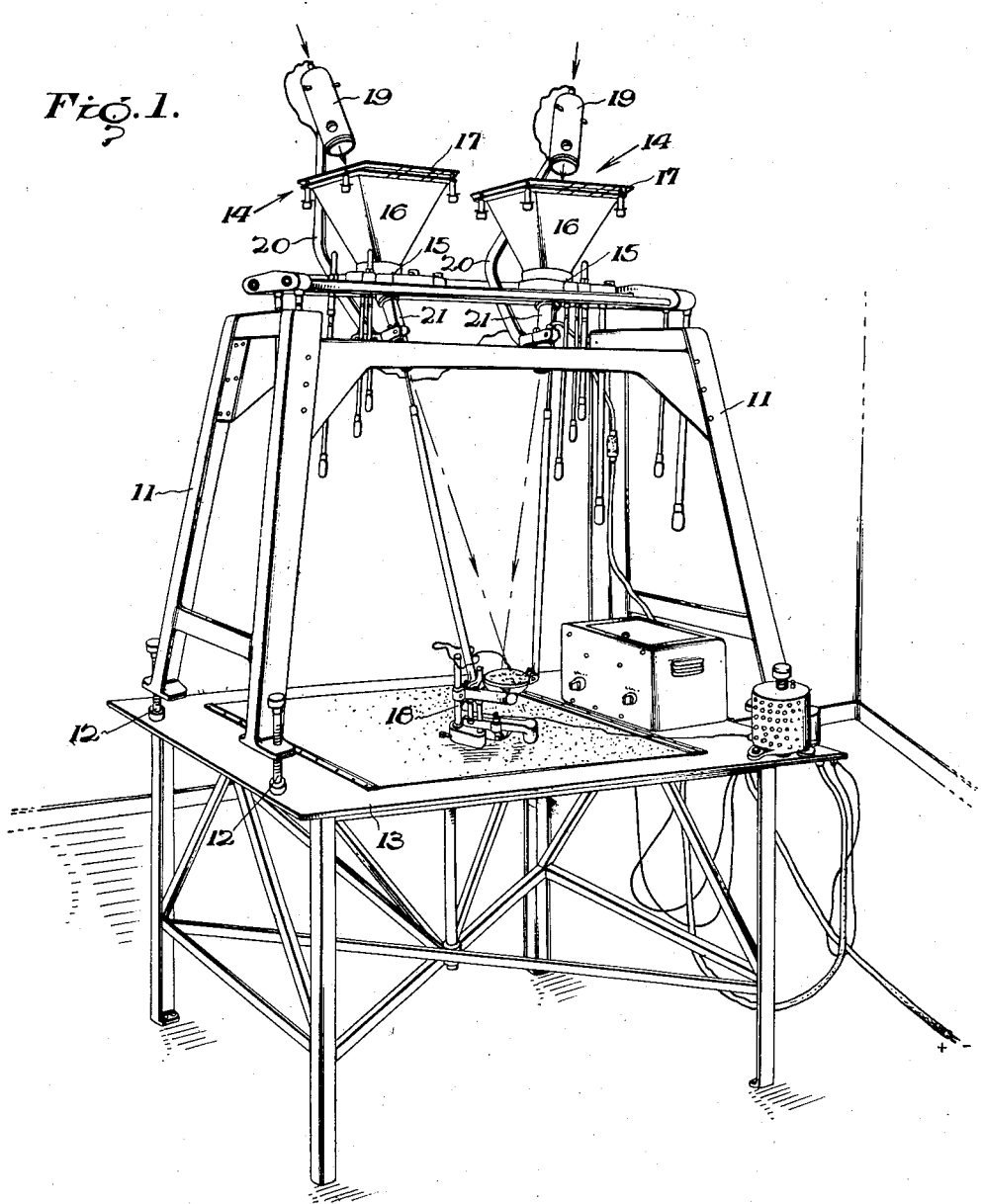
Fig. 1 is a perspective view of one form of optical instrument to which the present invention is adaptable.
Figure 2:
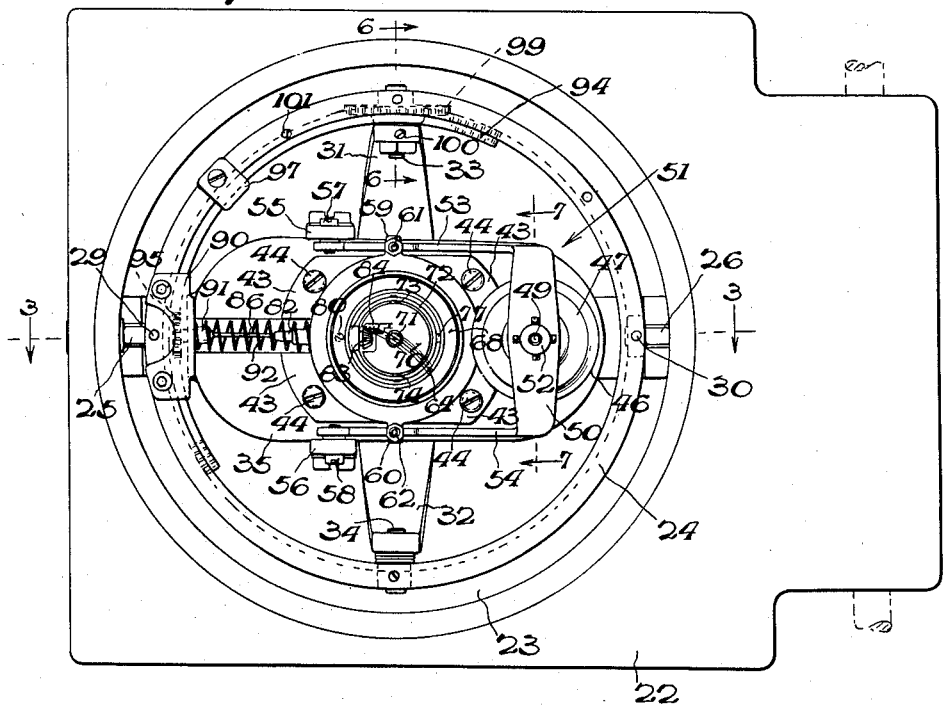
Fig. 2 is a plan view of one of the lens supporting units containing an embodiment of the present invention.
Figure 3:
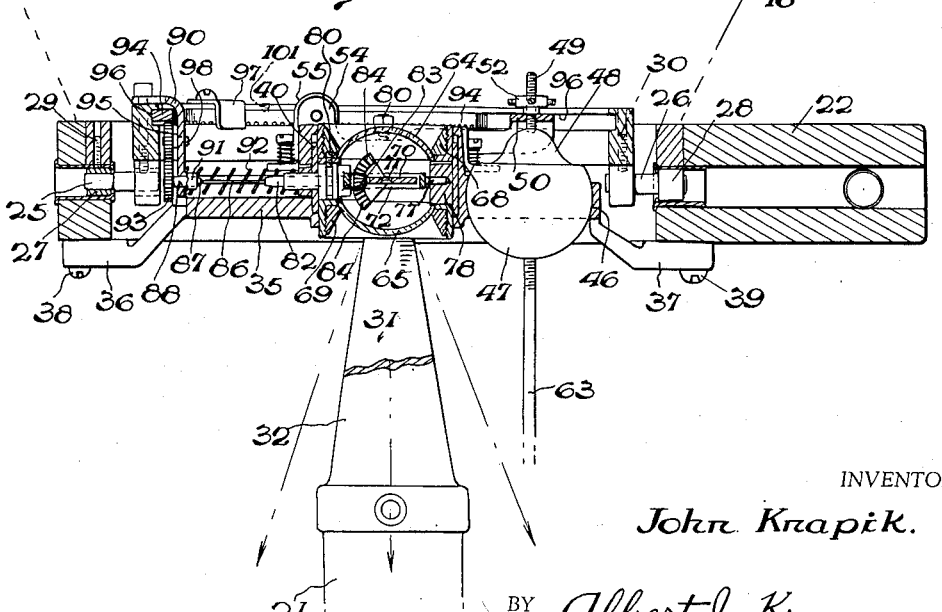
Fig. 3 is a sectional view along the line 3—3 of Fig. 2.

Referring with more particularity to the drawing in which like numerals designate like parts throughout the several views, the embodiment is illustrated and will be described hereinafter with reference to a form of photogrammetric plotting instrument of the type illustrated in Fig. 1 and which comprises generally, a suitable frame structure 11, mounted on adjustable legs 12 and supported on a table 13 or other suitable horizontal support. At the top of the frame there is mounted a pair of optical projector units, indicated generally at 14.

Each projector unit includes a base member 15 at the lower end of a hood-like member 16 in the form of a hollow inverted truncated pyramid. The top of each member 16 is adapted to carry one of a stereoscopic pair of diapositives 17 whose images are to be projected to form an anaglyphic model over the tracing table 18. A light projector 19 is movably disposed above each diapositive 17 on the upper end of a gooseneck arm 20. The lower end of the gooseneck arm extends around the member 16 and is secured beneath it to a tubular member 21. The member 21 is swingingly supported in a manner hereinafter more fully described and its movements are constrained by a linkage system (see patent referred to above) so that it is always in axial alignment with the beam of light from its corresponding light beam projector 19 and the node or nodal region of the lens system which is mounted in and supported by the base member 15.

The lens unit comprises a support block 22 having a circular opening 23. Within the opening 23 there is cradled a gimbal ring 24 by means of diametrically opposite trunnions 25 and 26 projecting from the outer edge of the ring in anti-friction bearings 27 and 28, respectively, within the block 22. The trunnions 25 and 26 are fixed for rotation with the gimbal 24 by means of set screws 29 and 30, respectively.

The upper end of the tubular member 21 is bifurcated terminating in the form of a Y and the arms 31 and 32 thereof are pivoted to the gimbal ring 24 by means of stub shafts 33 and 34, the pivoting axis being at right angles to the axis of the trunnions 25 and 26. By these means a gimbal movement is provided for the tubular member 21.

Between the arms 31 and 32 there is disposed a bridge member 35, the ends 36 and 37 of which are secured to the bottom of the block 22 directly below the trunnions 25 and 26 by screws 38 and 39 or any other suitable means. The bridge member 35 has a central aperture with upper and lower guide flanges 40 and 41 in which the lens barrel 42 is slidably mounted for axial movement.

The lens barrel 42 has outwardly projecting flanges 43. A plurality of pins 44 are slidably disposed through apertures in the flanges and secured to the lower bridge member 35. The top of the pins 44 are provided with heads and compression springs 45 are disposed between the head and the flanges 43 so as to bias the lens barrel downwardly in the aperture.

On one side of the said aperture there is provided, through the bridge member 35, an annular seat 46 having a spherical segment surface diverging upwardly and which is adapted to support a ball member 47. The lower surface of the ball member is spherical and free to move on the seat 46. The upper end of the ball 47 is provided with a special contour or cam surface 48 designed to compensate for radial distortion in the lens system, as explained in said patent referred to above.

A cam follower 49, in the form of a vertical pin having a ball point at its lower end, engages the top of the ball member 47, substantially as shown. Said follower 49 is secured to the web 50 of a U-shaped member 51 by means of a lateral displacement spider 52. The parallel arms 53 and 54 of the member 51 are pivoted at the opposite end to posts 55 and 56 by means of pins 57 and 58, said posts being secured to the bridge member 35.

Projecting outwardly from the lens barrel, along a diameter parallel to the axis of the pins 57 and 58, are fingers 59 and 60. These fingers carry adjustable abutment screws 61 and 62, the lower ends of which contact the arms 53 and 54, respectively. By these means, the springs 45, acting through the lens barrel, fingers 59 and 60, abutment screws 61 and 62 and arms 53 and 54 of the U-shaped member 51, hold the ball point of the follower 49 in constant engagement with the ball member 47. As the ball member moves, depending upon the contour of its upper portion, the ball point rises and falls and causes the lens barrel 42 also to rise and fall a corresponding distance as determined by the leverage of the U-shaped member 51.

The ball member 47 is moved by means of a depending arm or rod 63 having one end secured to the bottom thereof. The other end of the rod is connected to the tubular member 21 to provide a linkage system for moving the ball member 47 in accordance with the movements of the tubular member 21 and hence shifting the lens barrel axially to compensate for radial distortion of the lens system carried by it for each particular point of the lens system through which light from the projector happens to be passing at the time. For a detailed description of the linkage system, see the patent referred to above.

The lens system illustrated comprises a pair of outwardly bowed lenses 64 and 65, at the top and bottom, respectively, of the lens barrel. The edges of the lenses rest in annular seats 66 and 67 and they are held in place by seating rings 68 and 69 threadedly engaging the inner walls of the barrel and resting against the outer edge of the lenses, substantially as shown.

Between the lenses 64 and 65, the diaphragm 70, having an aperture 71 therethrough, is gimbaled. The gimbaling is effected by means of a gimbal ring 72 in the lens barrel within which the diaphragm is disposed and to which it is cradled by means of pin shafts 73 and 74 rotatably mounted in fine bearings 75 and 76 of the gimbal ring. The gimbal ring itself is cradled up to the inner walls of the lens barrel by a pin shaft 77 on one side projecting in a fine bearing 78 in the wall of the lens barrel, the other side being connected to a hollow shaft 79. The latter shaft passes through and is journaled in the wall of the lens barrel. It is held in place by a set screw 80 of the lens barrel engaging an annular groove 81 of the shaft. Consequently, rotation of the hollow shaft 79 causes the gimbal ring 72 to turn on its pivotal axis and carry with it the diaghragm 70.

The hollow part of the shaft 79 is a bearing for an inner shaft 82, to the inner end of which a beveled pinion 83 is secured. The pinion meshes with a vertical curved rack 84 secured to the diaphragm. The diaphragm has a recessed or cut out portion 85 around the pinion 83 so as to avoid interference therewith and the rack 84 projects partly above and partly below the plane of the diaphragm.

The outer end of the shaft 82 extends a short distance beyond the corresponding end of the hollow shaft 79 and has secured to it one end of a flexible shaft 86, such as a wire or other suitable member. The other end of the flexible shaft 86 is connected to a shaft 87 mounted in a bearing 88 of the vertical wall 89 of a bracket 90. The bracket 90 is secured to gimbal ring 24 and its vertical wall 89 is spaced inwardly from the inner side of said gimbal ring.

The bearing 88 has a portion 91 thereof projecting toward the hollow shaft 79 and it is connected thereto by flexible means, such as a coil spring 92, the latter being frictionally engaged at either end with the outer surface of the shaft 79 and the portion 91, substantially as shown. The frictional engagement permits relative adjustments between the bearing 88 and shaft 79. By these means, pivotal movement of the gimbal ring 24 is transmitted through the portion 91 and spring 92 to shaft 79, to pivotally turn the gimbal ring 72 an equal amount.

The shaft 87 extends through its bearing 88 and is secured to a spur gear 93 which is disposed in the space between the bracket wall 89 and the gimbal ring 24. The spur gear 93 is geared to a circular rack 94 through an idler 95. The rack 94 is slidably mounted in an inner groove 96 of the gimbal ring 24 and is held in position by the bracket 90 and one or more additional retainers 97, only one such retainer being shown. The idler 95 is mounted on a shaft 98 secured to the bracket wall 89.

A pinion gear 99 engages the rack 94 and is mounted on the stub shaft 33. It is secured for rotation with the upper end of the arm 31. By these means a swinging movement of the tubular member 21 is transmitted through the gear 99, rack 94, idler 95, spur 93, shaft 87, and flexible shaft 86 to inner shaft 82 to which the beveled pinion 83, in mesh with the rack 84, is secured, thereby causing diaphragm 70 to tilt in whichever direction the tubular member 21 swings. The gears are so proportioned that the diaphragm always tilts through the same angle as the tubular member.

It is apparent from the above, that the swinging of the tubular member 21 in any direction will result in a corresponding angular movement of the diaphragm and thereby the diaphragm will always be in a plane at right angles to the axis of the tubular member. Since the axis of the tubular member is aligned with the light projector 19, it follows that the diaphragm will always be at right angles to the source of light resulting in a circular beam of light passing through the diaphragm in all positions thereof.

Due to the flexibility of the shaft 86 and the coil spring 92, the lens barrel is free to move vertically under the influence of the cam means acting through the U-shaped member 51.

In some instances, it is desirable to set the diaphragm 70 at a predetermined angle relative to the inner gimbal 72, so that relative movement of the tubular member 21 effects a movement of the diaphragm in only one coordinate direction. This is particularly important in using models made from convergent photography. In cases of this kind, it is very difficult to obtain the desired and necessary light balance because of the unequal distances of the points of the model from the light projectors 19. The two diapositives are set at an angle toward each other, rather than vertically, that is, their respective axes intersect at a point below and between them. The present customary practice utilizes an angle of about 40° between the axes thereof, each diapositive making an angle of about 20° with the vertical. Accordingly, as the light beam projectors 19 move over the diapositives, the lengths of the light beams vary considerably from one extreme position to the other in the case of motion along or parallel to the plane of the said axes. In most instances, any given point of intersection of a corresponding pair of light rays will be at a greater distance from one light projector than it is from the other light projector. Since the intensity of light at a point varies inversely as the square of the distance from the source of light, it follows that with equal sources of light, the light at the point of intersection from each projector will be of different intensity. This is compensated in accordance with the present invention by mounting the pinion 99 for rotation with the shaft 33 and securing the shaft by a set screw 100 to the arm 31. The pinion 99 is loosened relative to the arm by retracting the set screw. The rack 94 is then moved until the diaphragm is tilted in a position perpendicular to a line passing through a point on the diapositive representing the longest ray of light to be used. The rack 94 is then clamped in this position by means of a set screw 101. As a result of this fixed presetting of the diaphragms, light passing therethrough will, in each case, vary as the angle between the said line and the axis of its corresponding light beam projector 19. Consequently, the points of intersection of rays from a corresponding pair of points will receive diminished illumination from the nearer projector and correspondingly increased illumination from the farther projector. At the same time, the movement of the diaphragm in the other coordinate direction is unaffected.

Having thus described my invention, I claim:

1. In an optical projection photogrammetric plotting instrument comprising a lens barrel having lenses therein, a gimbal ring within and diametrically pivoted to said lens barrel, a diaphragm within said lens barrel and diametrically pivoted to the gimbal ring at right angles to the pivot axis of the gimbal ring, a hollow shaft rotatably mounted through the wall of the lens barrel concentric with the pivot axis of the gimbal ring, said shaft being connected to the gimbal ring, an inner shaft rotatably mounted in said hollow shaft, a gear secured to said inner shaft, a rack meshed with said gear, said rack being secured to said diaphragm, an operator on the exterior of said lens barrel, said operator being pivoted to a gimbal ring surrounding said lens barrel, said surrounding gimbal ring being pivoted relative to said lens barrel at right angles to the pivot axis of said operator and gimbal ring, means connecting said hollow shaft and said surrounding gimbal ring for copivotal movement, and means connecting said operator to said inner shaft for copivotal action, whereby in all positions of the projector relative to a diapositive the light passing through the lens barrel will pass through the diaphragm of effectively fixed central opening so as to give the best utilization of the optical area of the projector lenses.

2. In an optical projection photogrammetric plotting instrument comprising a lens barrel having lenses therein, a gimbal ring within and diametrically pivoted to said lens barrel, a diaphragm within said lens barrel and diametrically pivoted to the gimbal ring at right angles to the pivot axis of the gimbal ring, a hollow shaft rotatably mounted through the wall of the lens barrel concentric with the pivot axis of the gimbal ring, said shaft being connected to the gimbal ring, an inner shaft rotatably mounted in said hollow shaft, a gear secured to said inner shaft, a rack meshed with said gear, said rack being secured to said diaphragm, an operator on the exterior of said lens barrel, said operator being pivoted to a gimbal ring surrounding said lens barrel, said surrounding gimbal ring being pivoted relative to said lens barrel at right angles to the pivot axis of said operator and gimbal ring, means connecting said hollow shaft and said surrounding gimbal ring for copivotal movement, a second gear connected to said inner shaft, another gear connected to said operator for rotation therewith relative to the outer gimbal ring, and intermediate gearing means connecting said last mentioned gears together for coaction, whereby in all positions of the projector relative to a diapositive the light passing through the lens barrel will pass through the diaphragm of effectively fixed central opening so as to give the best utilization of the optical area of the projector lenses.

3. The subject matter defined by claim 1 in which the means connecting the hollow shaft and the surrounding gimbal ring is flexible.

4. The subject matter as defined by claim 2 in which the second gear is connected to the inner shaft by a flexible member.

5. In an optical projection photogrammetric plotting instrument comprising a support, a lens barrel having lenses therein and means for axially moving said lens barrel relative to the support, said means including an operator on the exterior of said lens barrel and an outer gimbal ring pivoted to the support, said operator being pivoted to the gimbal ring at right angles to the pivot axis of the ring on the support, an inner gimbal ring within and diametrically pivoted to the lens barrel on an axis aligned with the pivot axis of the outer gimbal ring, a diaphragm within said lens barrel and diametrically pivoted to the inner gimbal ring at right angles to the pivot axis of said inner gimbal ring, a hollow shaft rotatably mounted through the wall of the lens barrel concentric with the pivot axis of said gimbal rings, said shaft being connected to the inner gimbal ring, flexible means connecting said shaft to the outer gimbal ring for rotation therewith, an inner shaft rotatably mounted in said hollow shaft, a gear secured to said inner shaft, a rack meshed with said gear, said rack being secured to said diaphragm, a second gear axially aligned with said inner shaft, said second gear being rotatably carried by said outer gimbal ring, flexible means connecting said second gear to said inner shaft for corotation, and means for rotating said second gear in response to the pivotal movement of said operator relative to the outer gimbal ring, whereby in all positions of the projector relative to a diapositive the light passing through the lens barrel will pass through the diaphragm of effectively fixed central opening so as to give the best utilization of the optical area of the projector lenses.

6. In an optical projection photogrammetric plotting instrument comprising a support, a lens barrel having lenses therein and means for axially moving said lens barrel relative to the support, said means including an operator on the exterior of said lens barrel and an outer gimbal ring pivoted to the support, said operator being pivoted to the gimbal ring at right angles to the pivot axis of the ring on the support, an inner gimbal ring within and diametrically pivoted to the lens barrel on an axis aligned with the pivot axis of the outer gimbal ring, a diaphragm within said lens barrel and diametrically pivoted to the inner gimbal ring at right angles to the pivot axis of said inner gimbal ring, a hollow shaft rotatably mounted through the wall of the lens barrel concentric with the pivot axis of said gimbal rings, said shaft being connected to the inner gimbal ring, flexible means connecting said shaft to the outer gimbal ring for rotation therewith, an inner shaft rotatably mounted in said hollow shaft, a gear secured to said inner shaft, a rack meshed with said gear, said rack being secured to said diaphragm, a second gear axially aligned with said inner shaft, said second gear being rotatably carried by said outer gimbal ring, flexible means connecting said second gear to said inner shaft for corotation, a third gear connected to said operator for rotation therewith relative to the outer gimbal ring, and intermediate gearing means connecting said second and third gears together for coaction, whereby in all positions of the projector relative to a diapositive the light passing through the lens barrel will pass through the diaphragm of effectively fixed central opening so as to give the best utilization of the optical area of the projector lenses.

7. An optical instrument as defined by claim 6, in which the intermediate gearing means comprises a curved rack slidably mounted on the outer gimbal ring, said rack being in meshed relation with said second and third gears.

8. An optical instrument as defined by claim 6 in which the intermediate gearing means comprises a curved rack slidably mounted on the outer gimbal ring, and an idler gear meshed with the second gear, said curved rack being in meshed relation with said third gear and said idler gear.

9. The subject matter of claim 6 in which the third gear is disengageably connected to the operator and means for disengageably clamping the intermediate means in fixed position relation to the second gear.

References Cited in the file of this patent

UNITED STATES PATENTS

| Number | Name | Date |
| --- | --- | --- |
| 154,607 | Holmes | Sept. 1, 1874 |
| 1,889,042 | Barr | Nov. 29, 1932 |
| 2,079,090 | Von Gruber | May 4, 1937 |
| 2,285,768 | Drucker | June 9, 1942 |
| 2,324,133 | Burgess | July 13, 1943 |
| 2,374,981 | Cooke | May 1, 1945 |
| 2,492,870 | Kelsh | Dec. 27, 1949 |
| 2,552,975 | Kelsh | May 15, 1951 |